(12) United States Patent
Kowalski

(10) Patent No.: US 6,693,971 B1
(45) Date of Patent: Feb. 17, 2004

(54) WIDEBAND CO-SITE INTERFERENCE REDUCTION APPARATUS

(75) Inventor: Anthony M. Kowalski, Miller Place, NY (US)

(73) Assignee: BAE Systems Information and Electronic Systems Integration Inc., Greenlawn, NY (US)

(*) Notice: Subject to any disclaimer, the term of this patent is extended or adjusted under 35 U.S.C. 154(b) by 0 days.

(21) Appl. No.: 09/515,803

(22) Filed: Feb. 29, 2000

(51) Int. Cl.[7] .............................................. H04B 15/00
(52) U.S. Cl. ...................................................... 375/285
(58) Field of Search ................................ 375/132, 133, 375/138, 140, 141, 135, 146, 284, 285, 296; 379/406, 410, 411, 392; 370/286, 289, 291; 455/114, 109, 67.3, 63, 501

(56) References Cited

U.S. PATENT DOCUMENTS

| | | | | |
|---|---|---|---|---|
| 3,932,818 A | * | 1/1976 | Masak | 708/322 |
| 4,612,669 A | * | 9/1986 | Nossen | 455/123 |
| 5,414,433 A | * | 5/1995 | Chang | 342/375 |
| 5,592,179 A | * | 1/1997 | Windyka | 342/372 |
| 5,701,583 A | * | 12/1997 | Harbin et al. | 455/25 |
| 5,818,386 A | * | 10/1998 | Belisle | 342/372 |
| 5,861,845 A | * | 1/1999 | Lee et al. | 342/375 |
| 6,034,987 A | * | 3/2000 | Chennakeshu et al. | 375/133 |
| 6,131,013 A | * | 10/2000 | Bergstrom et al. | 455/63 |
| 6,320,540 B1 | * | 11/2001 | Meredith | 342/377 |
| 6,339,399 B1 | * | 1/2002 | Andersson et al. | 342/372 |

* cited by examiner

Primary Examiner—Emmanuel Bayard
(74) Attorney, Agent, or Firm—Edward A. Onders; William B. Ritchie

(57) ABSTRACT

An interference cancellation system for improved rejection of a signal coupled from a transmission antenna into a local receive antenna in the presence of local multipath. This interference cancellation system includes a frequency hopped radio adapted to operate in a dispersion environment. This frequency hopped radio has an instantaneously limited bandwidth communication channel operating over a substantially larger bandwidth. Transmission of a signal from the frequency hopped radio is via a directly coupled reference path and a received coupled path. A delay means is used for variably adjusting the phase slope delay of the signal in one path relative to the other path. The system employs an amplitude slope means for variably adjusting the amplitude slope of the signal in one path relative to the other path. A digital controlling means, associated with the delay means and the amplitude slope means, provides improved matching of the signal in each path, thereby enhancing the performance of the co-site interference reduction system.

35 Claims, 13 Drawing Sheets

TABLE 1

| τ (ns) | Σ LOBE NO. 1 | Δ LOBE NO. 2 | Σ LOBE NO. 2 | Δ LOBE NO. 3 | Σ LOBE NO. 3 | Δ LOBE NO. 4 | Σ LOBE NO. 4 | Δ LOBE NO. 5 |
|---|---|---|---|---|---|---|---|---|
| 29.23 | 34.21 | 51.32 | 68.42 | 85.53 | * | * | * | * |
| 30.77 | 32.50 | 48.75 | 65.00 | 81.25 | * | * | * | * |
| 32.31 | 30.95 | 46.43 | 61.90 | 77.38 | 92.85 | * | * | * |
| 33.85 | 29.54 | 44.31 | 59.08 | 73.86 | 88.63 | * | * | * |
| 35.88 | 28.26 | 42.40 | 56.53 | 70.66 | 84.79 | * | * | * |
| 36.92 | 27.09 | 40.63 | 54.17 | 67.71 | 81.26 | 94.80 | * | * |
| 38.46 | 26.00 | 39.00 | 52.00 | 65.00 | 78.00 | 91.00 | * | * |
| 40.00 | 25.00 | 37.50 | 50.00 | 62.50 | 75.00 | 87.50 | * | * |
| 41.54 | * | 36.11 | 48.14 | 60.18 | 72.22 | 84.26 | * | * |
| 43.08 | * | 34.82 | 46.43 | 58.03 | 69.64 | 81.24 | 92.85 | * |
| 44.62 | * | 33.62 | 44.82 | 56.03 | 67.23 | 78.44 | 89.65 | * |
| 46.15 | * | 32.50 | 43.34 | 54.17 | 65.01 | 75.84 | 86.67 | * |
| 47.69 | * | 31.45 | 41.94 | 52.42 | 62.91 | 73.39 | 83.88 | 94.36 |
| 49.23 | * | 30.47 | 40.62 | 50.78 | 60.94 | 71.09 | 81.25 | 91.41 |
| 50.77 | * | 29.55 | 39.39 | 49.24 | 59.09 | 68.94 | 78.79 | 88.64 |

* THESE FREQUENCIES ARE BELOW 25 MHz OR ABOVE 95 MHz.

FIG. 15

WIDEBAND CO-SITE INTERFERENCE REDUCTION APPARATUS

FIELD OF THE INVENTION

The invention relates to the field of radio communication and, in particular, to the reduction of interference in signals coupled from a transmission antenna into a local receive antenna in the presence of a local multipath.

BACKGROUND OF THE INVENTION

In co-site environments, a collocated source usually interferes with the receiver due to the finite isolation between the transmit and receive antennas. This interference in a co-site environment is a combination of several factors. There are two principal reasons for interference in a co-site environment: (1) desensitization caused by one or more nearby high-power transmitter carriers, and (2) wideband moderate to low-power interference components associated with those carriers. These interference components are received by the collocated radio and degrade system operation.

Wideband interference for each transmitter consists of three components: (1) near-in noise at frequencies close to the carrier, (2) periodic spurious signals across a major portion of the adjacent band, and (3) a broadband noise floor also spanning a major portion of the adjacent band.

Filtering Techniques

Fixed narrowband filters are applied to transmitters on an individual frequency channel to reduce spurious and broadband noise interference but are not applicable for radios which continually change channels. Frequency hopping (FH) filter technology has been applied to improve system performance in such systems. This technology reduces co-site interference through a front-end applique that limits the bandwidth of the wideband interference transmitted to the collocated receiver.

With frequency hopped waveforms, a look-ahead technique can protect the receiver at the expense of system bit-error-rate (BER). When control logic senses that one or more of the upcoming transmit frequencies will cause desensitization, the transmit carriers are internally terminated or attenuated. In an alternative approach, the collocated receiver is disabled when desensitization is expected. Performance improvement depends on the hop-set frequency range and is related to the bandwidth of the implemented filter. Larger hop-set bandwidths (>1000 times channel bandwidth) permit more improvement for a given filter bandwidth because frequency conflicts occur less often. This technique, however, may seriously degrade system-level bit error rates because transmission and/or reception are periodically disabled or attenuated.

Interference Cancellation System (ICS)

An Interference cancellation system is based on amplitude and phase adjustments of a sample of the collocated transmitter, which is then used to cancel the radiated interference at the input to the protected receiver. The adjustments are made by a correlation-based adaptive controller using feedback derived after the cancellation process.

Carrier cancellation with an ICS can range from 40 to 50 dB, totally eliminating desensitization without disabling the transmitter or receiver. However, dispersion and multipath effects can seriously limit cancellation of the wideband interference associated with the carrier. Dispersion is also time-varying, particularly in on-the-move embodiments. Therefore, previous ICS based co-site solutions have had limited performance for dispersion and multipath.

Limitations of Current Systems

Current methods of dealing with dispersion phenomena have been confined to compensation by hop-set restrictions, which may permit static calibration techniques to pseudo-optimize performance over limited bandwidths. Static calibration techniques have been limited to the addition of time delay within selected branches of the ICS. Experimental measurements on a two-antenna mobile relay configuration at VHF have confirmed the presence of virtual time delay shifts, spectral amplitude tilts, and both quadratic amplitude and phase errors. No prior art has considered a generic solution to the entire problem of dispersion-induced performance limitations.

SUMMARY OF THE INVENTION

The invention is an interference cancellation system for improved rejection of a signal coupled from a transmission antenna into a local receive antenna in the presence of local multipath. This interference cancellation system includes a frequency hopped radio adapted to operate in a dispersion environment. The frequency hopped radio has an instantaneously limited bandwidth communication channel operating over a substantially larger bandwidth. Transmission of a signal from the frequency hopped radio is via a directly coupled reference path and a received coupled path. A delay means is used for variably adjusting the phase slope delay of the signal in one path relative to the other path. The system employs an amplitude slope means for variably adjusting the amplitude slope of the signal in one path relative to the other path. A digital controlling means, associated with the delay means and the amplitude slope means, provides improved matching of the signal in each path, thereby enhancing the performance of the co-site interference reduction system.

Therefore, it is an aspect of the invention to provide a wideband co-site interference reduction system that uses an integrated FH transmit filter and an interference cancellation system (ICS), optimally combined to maximize wideband co-site interference rejection.

It is another aspect of the invention to provide an interference cancellation system that is applicable to frequency-hopped-waveform relay architectures and is extendable to multiple-antenna non-relay instrumented installations.

It is another aspect of the invention to provide an interference cancellation system having an applique architecture for ease of installation for both on-the-move and stationary platforms.

Another aspect of the invention is to provide an interference cancellation system having automatic dynamic equalization of dispersion components such as time delay and spectral amplitude tilt to enable wideband ICS nulling of the collocated transmitter. Operation can also be extended to other forms of dispersion, such as quadratic amplitude and phase errors.

It is still another aspect of the invention to provide an interference cancellation system which has an improved ICS adaptive controller based on a limiter or AGC-modified least-mean-square (LMS) algorithm, including off-line low-power FH filters to minimize correlation on extraneous signals.

It is still another aspect of the invention to provide an interference cancellation system which uses a transient suppressor to blank the receiver input and eliminate AGC capture during ICS transmitter nulling.

Finally, it is still another aspect of the invention to provide a wideband interference cancellation system using component designs supporting high power operation for maximum distortion-free range extension.

Table 1 describes the peaks of the lobes of the sum and difference port outputs for the 4 bit delay phase-shifter in the balanced configuration.

DETAILED DESCRIPTION OF THE INVENTION

Figure 1:
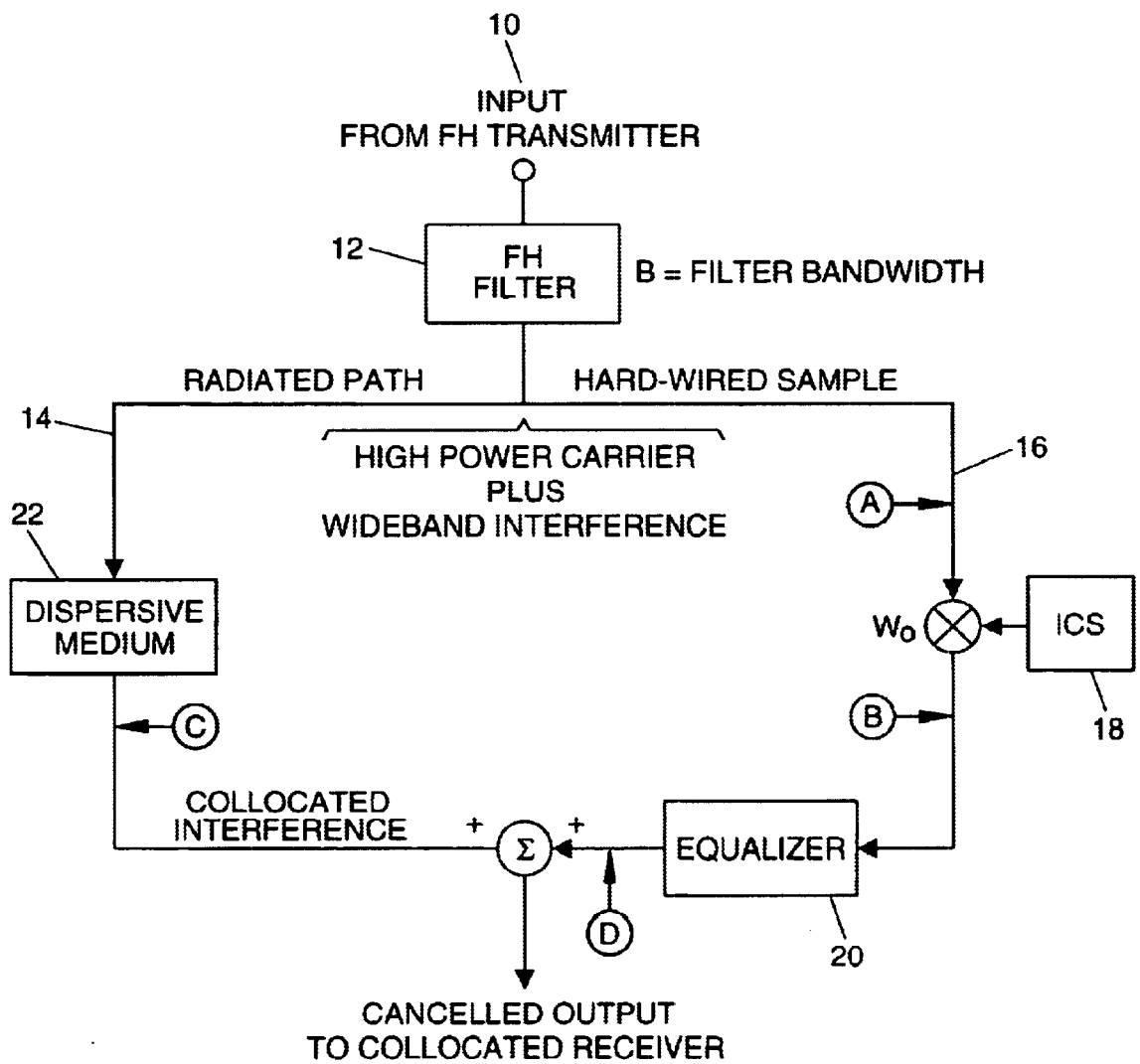
FIG. 1 illustrates a simplified diagram of the invention's integrated transmit hopping filter (FH) and wideband equalized interference reduction solution.

A simplified diagram of the inventor's integrated solution for a two-antenna installation is shown in FIG. 1. Extension of the invention to non-hopped systems is readily achievable and will be apparent to those skilled in the art. The integrated system has an input 10 that is received form a FH transmitter. FH filter 12 has bandwidth B. The input of FH filter 12 is connected to the input 10 from FH transmitter and the output of FH filter 12 is transmitted over a radiated path 14 and a hard-wired path 16. An improved ICS adaptive controller 18 and a channel-matching equalizer 20 are included in the hard-wired path 16. The total effect of the transfer functions of the transmit antenna, the receive antenna, and the radiated coupling between the antennas is embodied in the block called "dispersive medium" 22 in the radiated path 14.

An input from the collocated transmitter is processed by an FH filter 12. A hardwired sample is adjusted in amplitude and phase by a complex weight ($W_o$) derived from an improved ICS adaptive controller 18. The other output of the FH filter 12 is radiated over a dispersive medium 22 before it enters the cancellation node (Σ) through the receive antenna to form cancelled output which is received by a collocated receiver.

Figure 2:
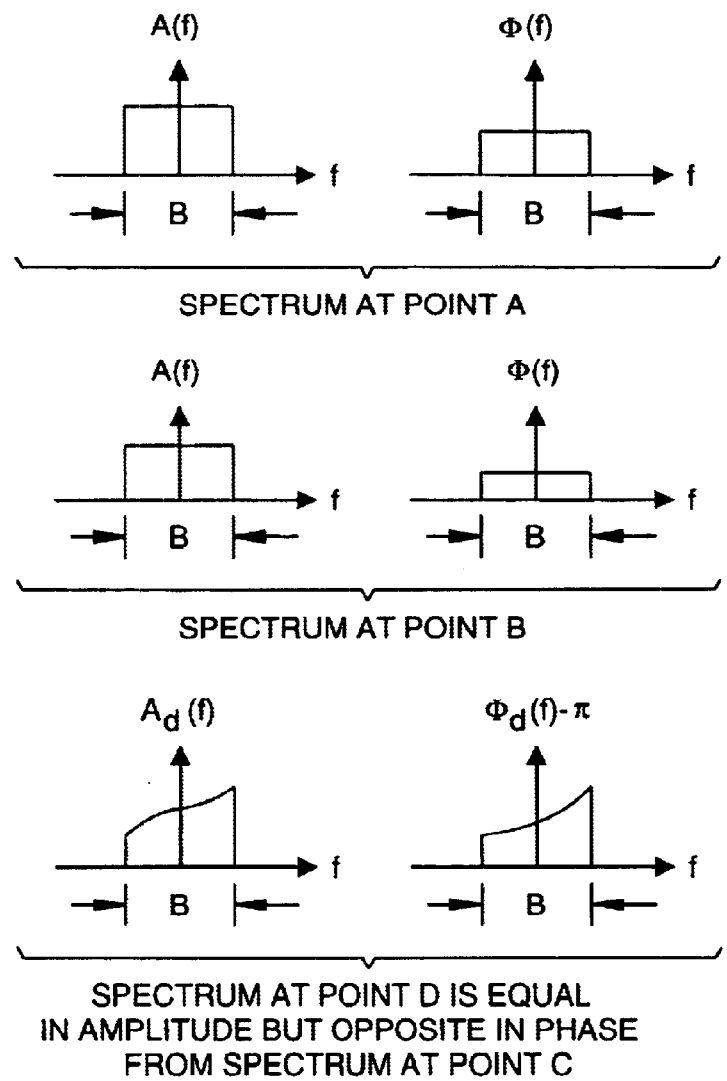
FIG. 2 illustrates spectra at points A, B and D of FIG. 1.
Figure 3:
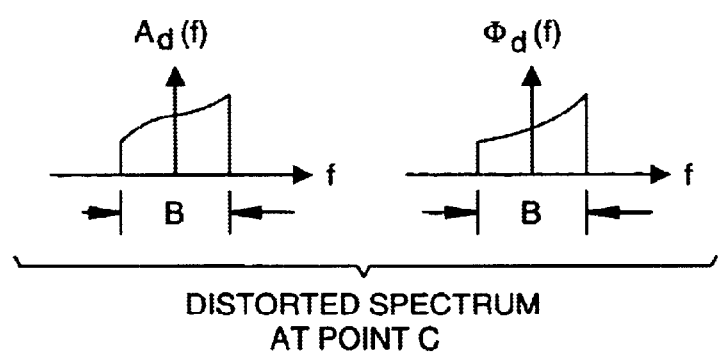
FIG. 3 illustrates a distorted spectrum at point C of FIG. 1.

The ICS complex weight operates to cancel the radiated narrowband transmitter carrier and the wideband interference that exists within the filter bandwidth (B). FIG. 2 illustrates amplitude and phase spectra over the band of the signal at various points of the hardwired sample signal path 16. FIG. 3 depicts the distorted amplitude and phase spectrum of the dispersive medium 22 over the bandwidth of the transmit signal.

The amplitude and phase spectra are constants over the filter bandwidth at points A and B as shown in FIG. 2. Values at point B are those at point A multiplied by $W_o$. The magnitude and phase of $W_o$ are derived from the ICS adaptive controller 18 and, in an ideal non-dispersive environment, would operate to cancel both the transmit carrier and wideband interference. However, dispersion causes frequency-dependent amplitude and phase spectra at point C shown in FIG. 3. The equalizer 20 in the hard-wired path 16 within the integrated processor dynamically adjusts both amplitude and phase over the filter frequency range so that the ICS operates to not only cancel the carrier but also the wideband interference components within the filter bandwidth.

REPRESENTATIVE VHF TWO-ANTENNA EMBODIMENT

Figure 4:
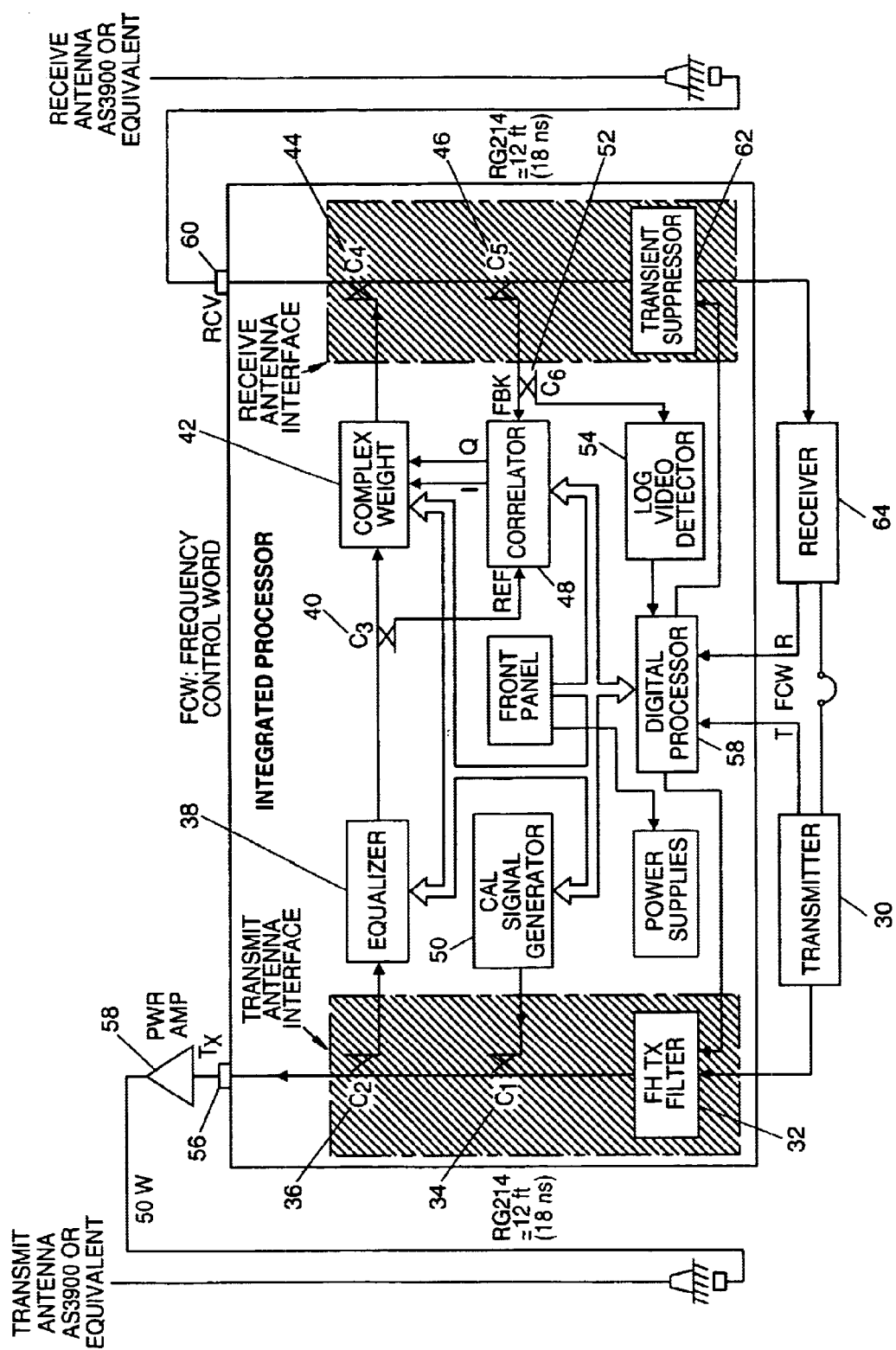
FIG. 4 illustrates the embodiment of the invention as an appliqué to an existing radio in a two-antenna VHF relay example.

Referring now to FIG. 4, the preferred embodiment of the invention is the two-antenna FH relay at VHF operating on a mobile platform. This system has the following major components:

Transmit Antenna Interface

The transmit antenna interface accepts a 4 watt, hopping transmit signal from the transmitter 30. The transmit signal is first passed through a frequency-agile transmit filter 32 that removes broadband noise and far-out synthesizer spurs from the frequency-hopped transmitter spectrum prior to transmission. The FH transmit filter 32 also establishes the bandwidth parameter B.

The output of the transmit hopping filter feeds a −20 dB directional coupler $C_1$ 34 used for calibration-signal injection and a −6 dB directional coupler $C_2$ 36 used for obtaining a reference sample of the collocated transmit signal for processing by the equalizer 38 and subsequent subsystems. In a higher power embodiment, the forward output of coupler $C_2$ 36 drives a 50-watt power amplifier and transmit antenna.

Equalizer

The equalizer 38 in this embodiment consists of a variable amplitude tilt network and a variable delay network. Other embodiments of the invention may compensate for different forms of dispersion. The equalized transmit signal is passed through an adaptively controlled complex weight 42, which adjusts the amplitude and phase of the equalizer output. The output of the complex weight is injected into coupler $C_4$ 44 where cancellation of the transmit leakage occurs.

The adaptive controller can be any of the many embodiments using correlation of the feedback and the input signals or digital search algorithms. The adaptive controller in this embodiment is based on the LMS algorithm and is implemented by the correlator 48 and complex weight 42 in addition to signal samples derived from couplers $C_3$, $C_4$, and $C_5$ (40, 44 and 46).

The calibration time interval is equal to the synthesizer set-up interval of the transmitting radio. During the calibration time interval, the CAL signal generator 50 outputs a pseudo-wideband test signal at the anticipated upcoming transmit frequency. Modulation is two tones spaced equidistant from the expected transmit frequency. Low power is used to minimize corruption of the receive channels to which the receiver 64 may be tuned. In variants of the embodiment, these tones can be either randomized in spacing to further limit effects on the receiver, or selected with an algorithm optimized with frequency controlled word (FCW) information.

The CAL signal is injected into coupler $C_1$ 34 generating both a coupled input into the equalizer 38 and a test signal for radiation over the dispersive path between the transmit and receive antennas. When this test signal is applied to the adaptive controller, the set of eight states of the delay network and a subset of the 15 states of the amplitude tilt network are sequentially adjusted using a linear search approach to minimize the transmitted test signal in all possible combinations. The dwell time for each of the sequential states is selected at about 10 to 20 $\mu$s. During that time period, the complex weight is adapted by an LMS algorithm to determine the minimum power at the null formation node $C_5$ 46. The coupled output of $C_5$ 46 drives the input to coupler $C_6$ 52.

Coupler $C_6$ 52 drives a log video, detector 54, used for power estimation. Approximately 40 to 56 equalizer settings in this embodiment can be sorted to find the setting that yields the minimum overall power. The nominal values of both the available amplitude tilts and variable delays can be established based on experimental results and then fixed for any particular vehicle/scenario combination. The equalizer values for the deepest null of the CAL test signals are applied to the system during the on-time of the actual transmitter. Operation of the integrated processor then proceeds in a normal interference cancellation mode.

Time Delay Network

The transmitter output port $T_x$ 56 from the integrated processor of FIG. 4 is connected through a power amplifier 58 to the transmit antenna by a cable. A similar cable is used to connect the receive antenna to the receiver (RCV) input port 60. In the example analyzed for evaluation of the design, the combined nominal insertion delay of these two cables is 36 ns. Experimental results indicated about a 23 ns change in the two-antenna transfer delay for the multipath environment and the particular whip antennas available for the experiments.

Internal cables can be used to compensate for fixed, minimum delays but these may change depending upon the installation. The variable time delay of the equalizer 38 must be designed to compensate for the maximum change expected due to multipath environment variations. The variable time delay can be extended to provide the function of time delay match for differing installations to minimize installation customization.

Granularity of the delay network should be about 4 ns or less in the example selected to meet channel matching requirements supporting 35 dB or greater cancellation for a 2 MHz bandwidth. The high-power, frequency-hopping filter establishes cancellation bandwidth. Bandwidth of the filter changes with carrier frequency and depends on definition. Representative bandwidths range from about 4 to 1.5 MHz over the 88 to 30 MHz band. A baseline with a 3-bit, delay-network quantization, covering the range of 0 to 28 ns in 4 ns steps is assumed. The amplitude tilt network has a constant throughput delay of 26.2 ns. The total equalizer delay ranges between 26.2 ns and 54.2 ns. Other embodiments will require different precisions and total delays having different switched increments and numbers of bits of control. Any variable time delay implementation having sufficient granularity and range can be considered for this function but other system considerations may limit their applicability.

Switched-Delay-Element Design

Dynamic range of all components used in the equalizer and complex weight networks is a key design consideration of this embodiment. Use of individual high-gain active amplifiers is minimized. Limited dynamic range at high power levels can introduce two-tone intermodulation products, which do not exist on the radiated path to the cancellation node (coupler $C_4$ 44 of FIG. 4). These distortion components will generally not be cancelled by the adaptive controller.

Figure 5:
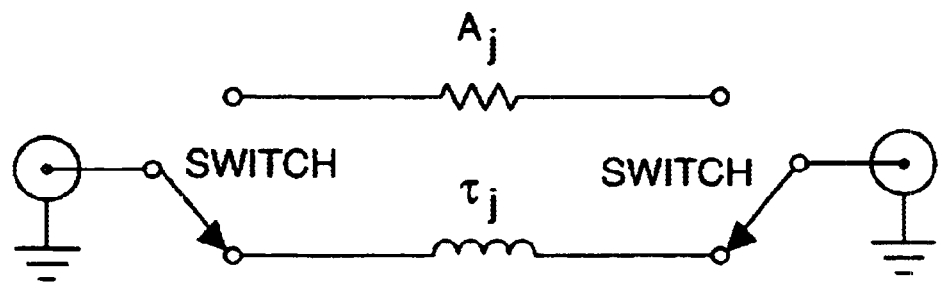
FIG. 5 illustrates a typical switched-delay-bit element.
Figure 6:
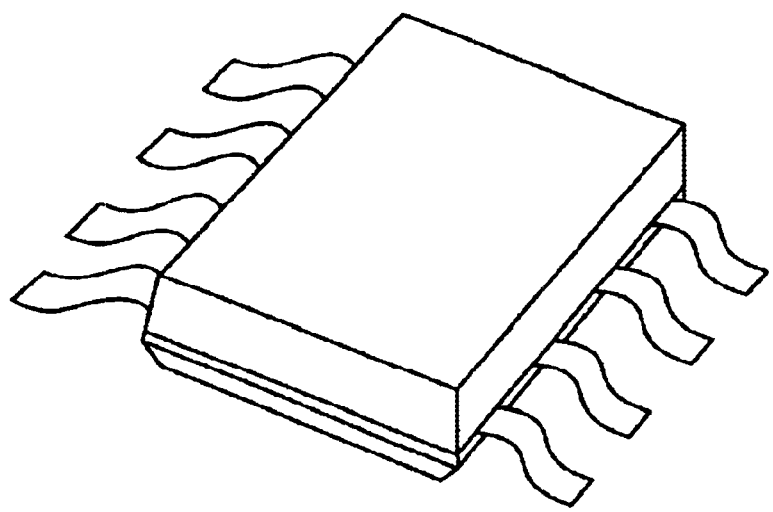
FIG. 6 illustrates a mechanical configuration of FIG. 5.

A typical switched-delay-bit design is shown in FIG. 5. To maintain constant insertion loss, each delay-value bit ($\tau_j$) can be individually compensated by a small attenuator $A_j$ in the complementary branch. Multilayer, polyamide printed-circuit fabrication techniques are used to minimize size and insertion loss. The 0.250 inch by 0.250 inch mechanical package of the representative switch is also shown in FIG. 6. The device has a 0.1 dB compression point and a maximum power level capability in excess of 4 watts to provide wide dynamic range and distortion free operation.

Amplitude Tilt Network

A variable amplitude tilt network with wide dynamic range is required to compensate for the dispersive path amplitude distortion. Two alternate embodiments are possible for this application.

Unbalanced Amplitude Tilt Network

Figure 7:
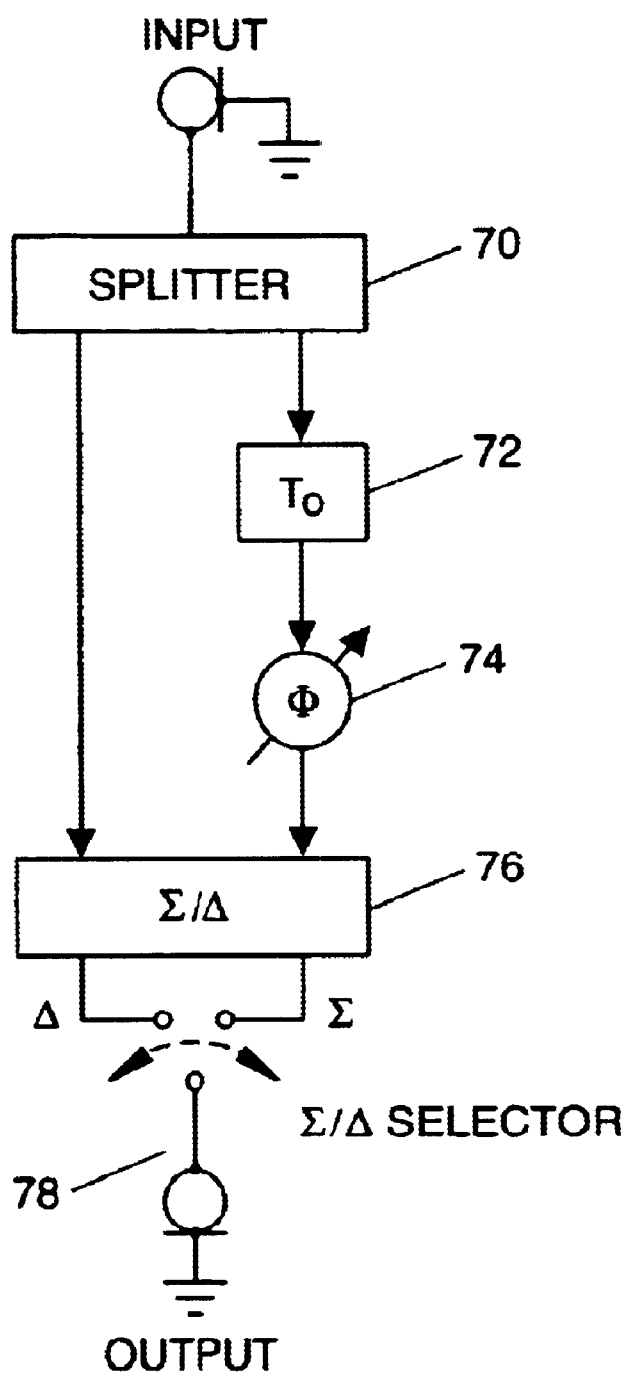
FIG. 7 illustrates an unbalanced embodiment of the amplitude tilt network.
Figure 8:
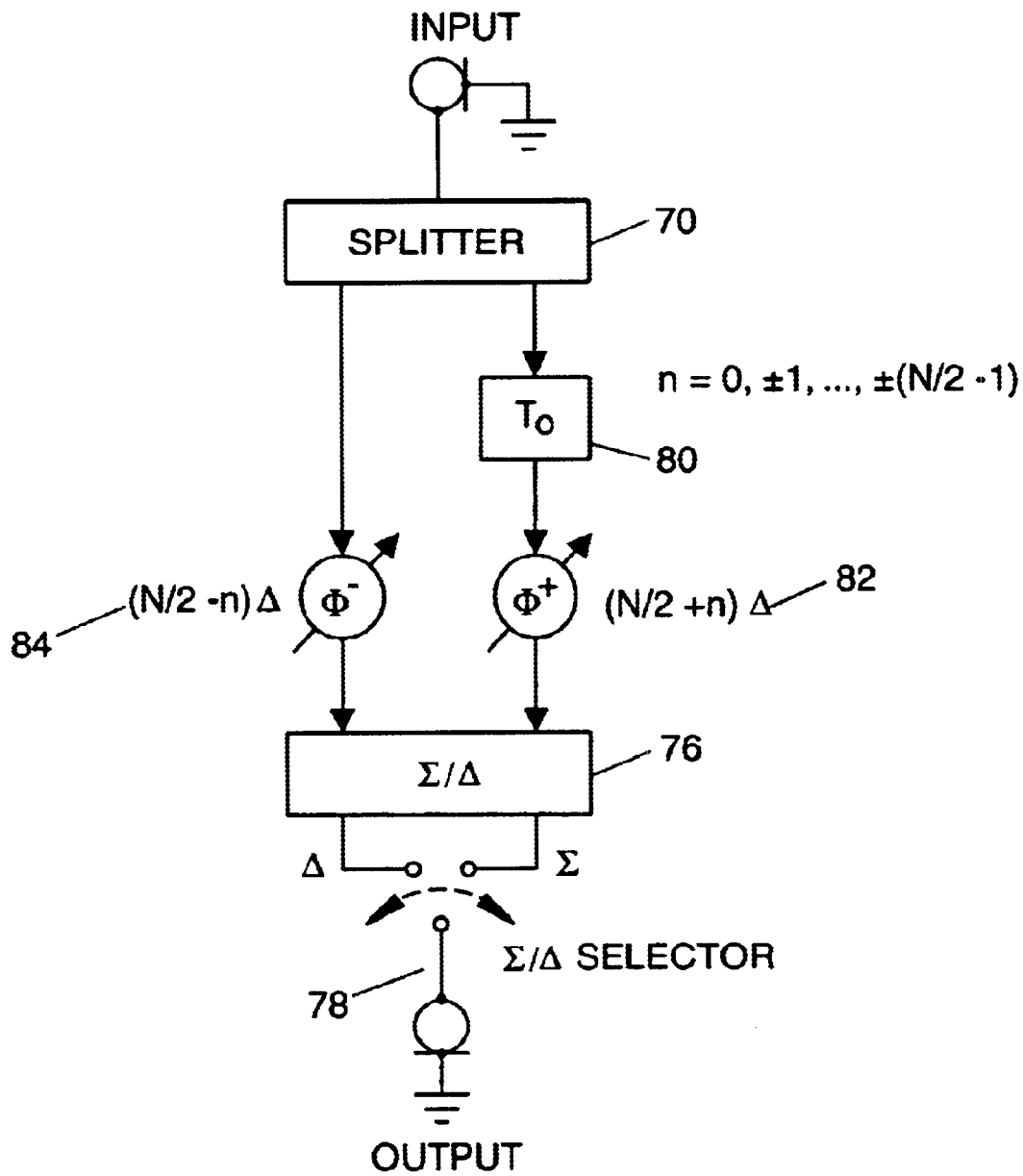
FIG. 8 illustrates a balanced embodiment of the amplitude tilt network.

Two alternative forms are possible for this application as shown in FIG. 7 and FIG. 8. In the unbalanced implementation of FIG. 7, the circuit consists of several components: (1) a splitter 70 to divide the signal into two equal components, (2) a nominal delay element $T_o$ 72, (3) a phase-shifter 74 in one path of the two signal paths, (4) a sum/difference ($\Sigma,\Delta$) hybrid 76 to recombine the two signals, and (5) a selector switch 78 to connect either the sum difference port of the hybrid to the output port. The selector switch 78 in this embodiment of the invention essentially halves the number of states required by the phase-shifter.

Figure 9:
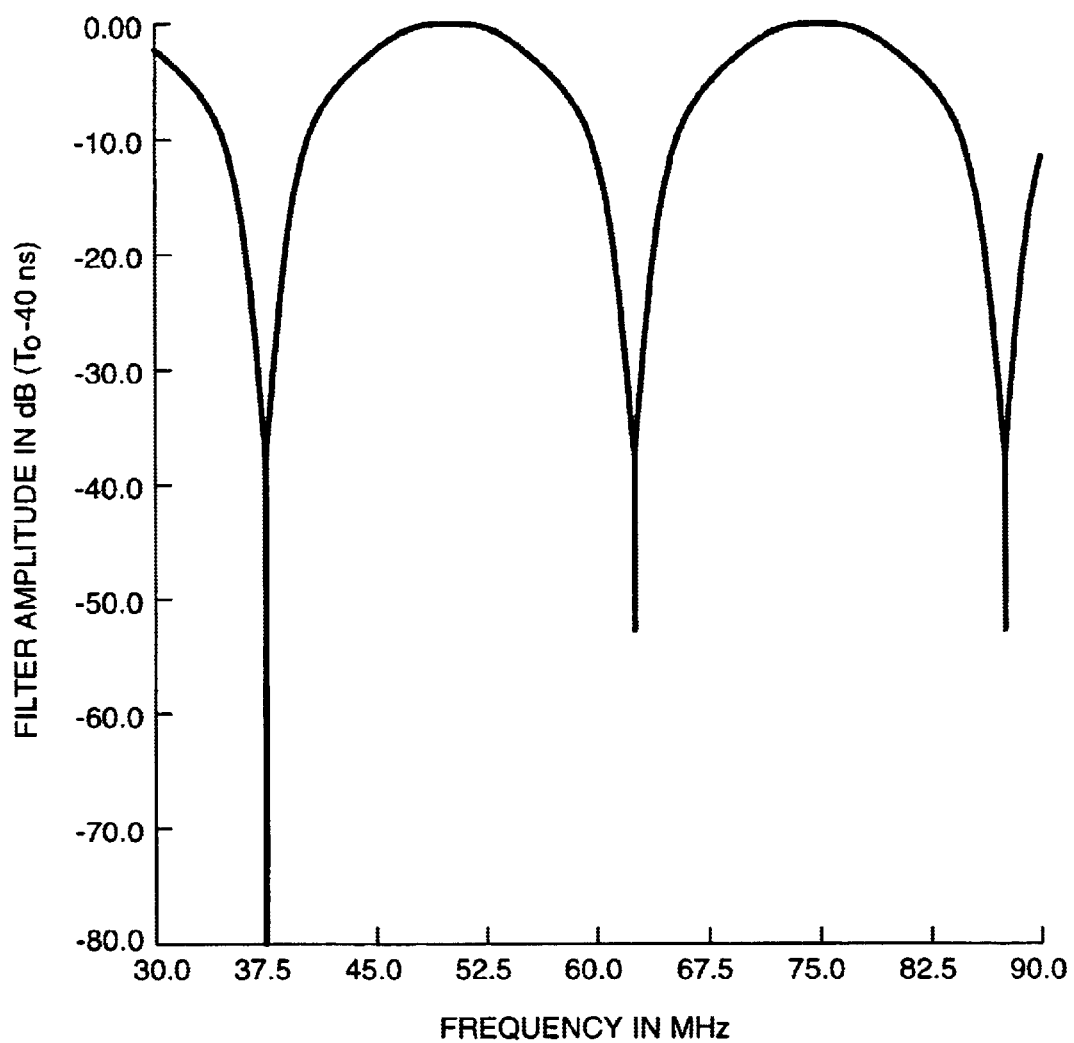
FIG. 9 is a graph showing frequency versus filter amplitude for the spectral response for the amplitude tilt network of FIG. 7 with a delay element ($T_o$) of 40 ns and phase-shifter setting of 0°.

FIG. 9 contains a line drawing of the spectral response for the amplitude tilt network of FIG. 7 with a delay element $T_o$ of 40 ns and phase-shifter setting of 0°. The selector switch is shown connecting the sum port to the output. The difference port output would consist of the same-shape spectrum except shifted in frequency. The lobes of the sum and difference spectra are interleaved with the same periodicity.

By variation of the phase-shifter value, the lobes can be shifted in position by an amount proportional to the inserted phase. A simple set of states for the phase-shifter can be determined to produce an appropriate division of the 30

MHz to 88 MHz band. This amplitude tilt network will have an associated delay from input to output. The nominal value for the delay is half of the delay element value, or 20 ns. Actual insertion delay of the unbalanced configuration, however, changes from the nominal value when the phase-shifter is toggled to achieve different amplitude tilts across the band.

Figure 10:
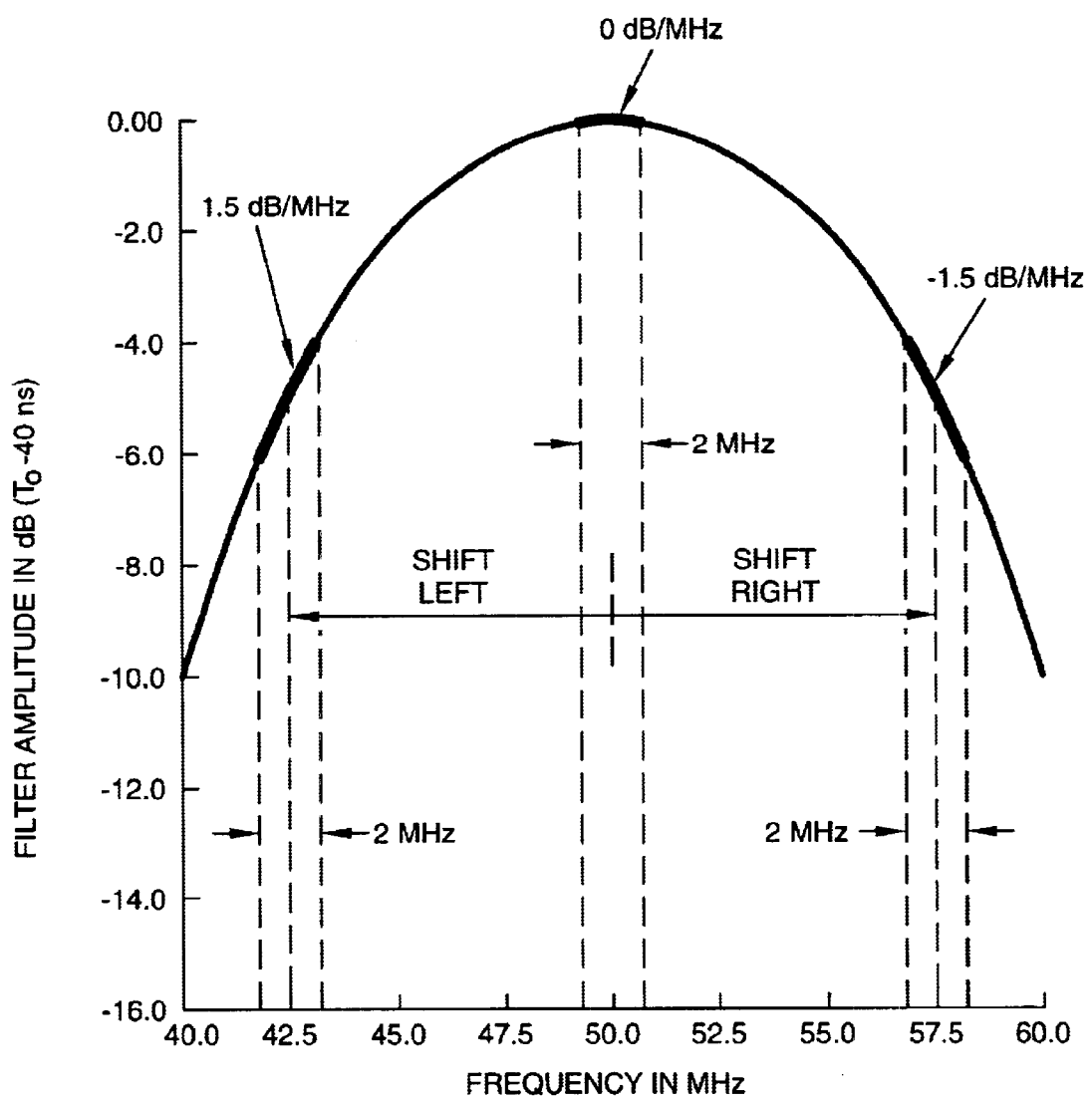
FIG. 10 is a graph showing frequency versus filter amplitude for the spectral lobe centered at 50 MHz on an expanded scale

The shape of the spectral lobes in the amplitude tilt network is clearly not linear. The question arises: Are the segments of the lobes over the signal bandwidth linear within acceptable limits? FIG. 10 shows the spectral lobe centered at 50 MHz on an expanded scale.

The greatest deviation from linearity occurs at the peak of the lobe. Over a 2 MHz bandwidth, the deviation from linearity is approximately quadratic in nature with a value of 0.14 dB per MHz. From the data graphed in FIG. 10, the error is consistent with better than 40 dB of cancellation. Therefore, segments of the lobe over several MHz of bandwidth are sufficiently linear to be used as amplitude tilt compression.

Errors in excess of 1 dB/MHz observed in experimental data require a compensating amplitude tilt of the same value from the network. Changes in the phase shifter value $\Phi$ of FIG. 7 will cause spectral amplitude, response to shift either to the right or to the left. Through proper selection of these frequency shifts, a wide range of linear amplitude tilts can be achieved. To a first order approximation, amplitude tilts of ±1.5 dB/MHz amplitude tilt can be applied to a 42.5 MHz receiver frequency by tuning the $\Sigma$ lobe of the spectral response to 50 MHz.

When considering simultaneously high-power handling capability and low loss, the best approach for implementation of the phase shifter in FIG. 7 is by a 4 bit delay phase shifter. However, for the unbalanced configuration, the selection process for the state of the subsequent 3 bit delay network and the state of the 4 bit delay phase shifter will require a preprogrammed table lookup for a given delay and amplitude tilt compensation. The reason for this need is the dependence of throughput delay on the state of the phase shifter in the amplitude-tilt network of FIG. 7. This effect is caused by the use of differential time delay to create a phase shift at a selected frequency.

Balanced Amplitude Tilt Network

The creation of variable throughput delay by the amplitude tilt network can be avoided in another embodiment of the invention at the expense of using two 4 bit delay phase-shifters, one in each path before the $\Sigma/\Delta$ hybrid, as well as the fixed delay element of 40 ns. This approach is shown in FIG. 8. With the uniform increments for the 4 bit delay phase shifter in the balanced configuration, the frequencies where the peaks of the lobes of the sum and difference port outputs occur are listed in TABLE 1.

This approach yields a constant throughput delay of 26.15 ns.

$T_o/2+(N/2)\Delta$:where $\Delta=0.7692$ ns and $N=16$.

By proper selection of the values of the 4 bit delay phase shifter, amplitude tilt compensation can be applied to any 2 MHz wide interval in the VHF band. Similar design approaches for different embodiments can provide design parameters for other bands, bandwidths, and amplitude slopes.

Complex Weight

Figure 11:
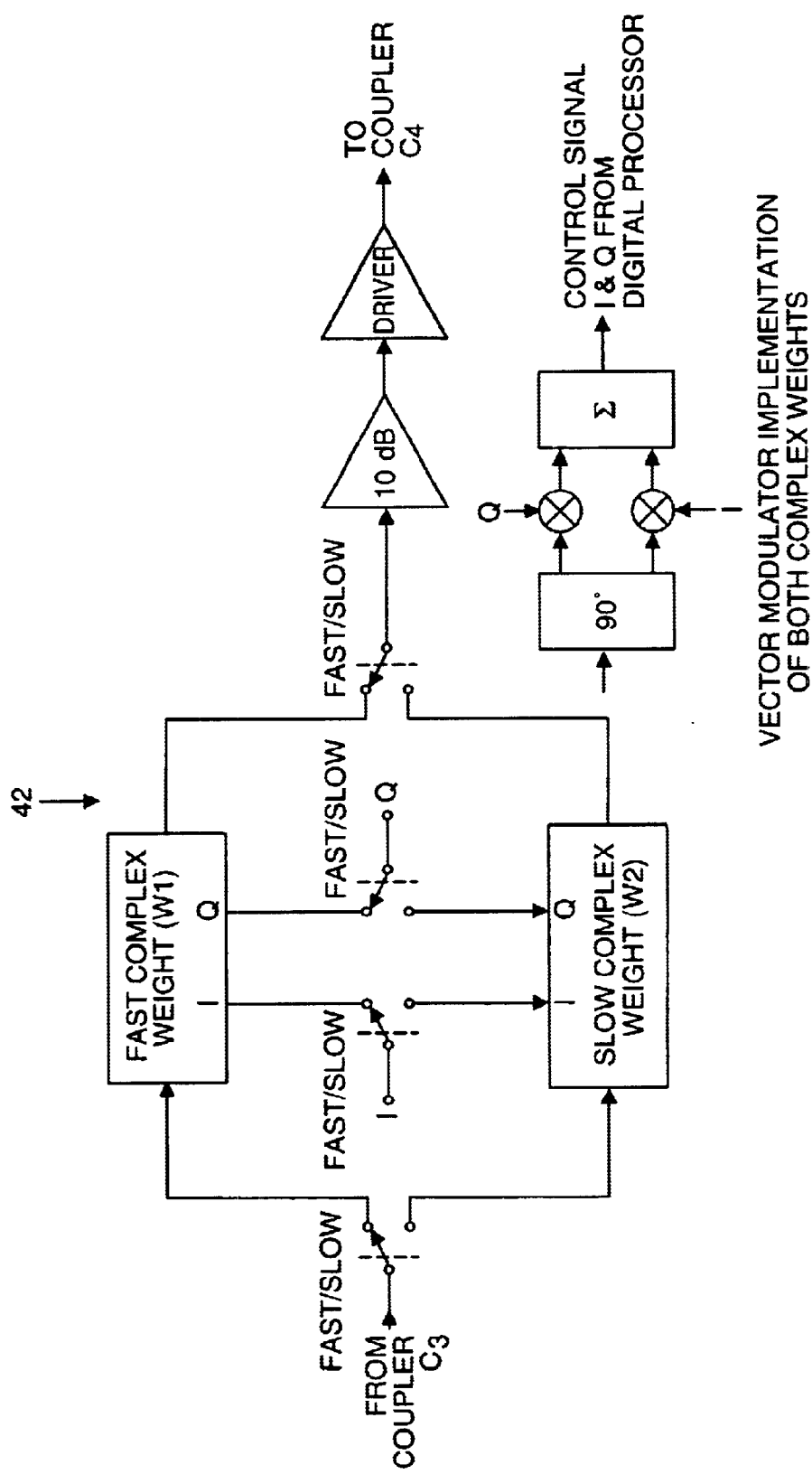
FIG. 11 illustrates the switched complex weights used in the embodiment to optimize performance in both the calibration and interference cancellation modes.

Referring to FIG. 4 and FIG. 11 for connections and details of the complex weight 42 are shown. The complex weight module processes the forward output of coupler $C_3$ 40. The output of $C_3$ 40 is either the transmitter sample or a low level calibration signal sample processed through the equalizer 38. The complex weight 42 is controlled by the correlator 48, which varies the phase and amplitude of the weight-input signal for optimum cancellation of the radiated sample input to coupler $C_4$ 44. The radiated sample is either the CAL signal or the transmitter. The CAL signal is used during the synthesizer setup time of the transmitting radio. The input signal to the complex weight 42 is switched between a fast response, low power vector modulator weight and a slower high dynamic range variant, as shown in FIG. 11.

A representative low power vector modulator can be based on a Schottky-diode attenuator design with a 40 MHz modulation bandwidth allowing the adaptive controller to null the CAL signal in 10 to 20 μs. This type of weight is capable of 0 dBm input power, which is sufficient for calibration-mode operation. The slower weight is capable of handling the high input power transmitter sample and allows nulling in about 200 μs. Pin-diode based attenuators are candidates for use in the high power mode. Amplifiers can be distributed within the equalizer 38 and complex weight 42 subsystems to compensate for insertion losses without introducing significant inter modulation products or additional noise. Wide dynamic range driver stage amplifiers can be used to provide up to a 4 watt output signal into the coupled input $C_4$ 44.

For the duration of the transmitter dead time, the calibration signal is nulled sequentially for each discrete setting of the equalizer 38. The process ends when no further null-depth improvements are measured. The high-power weight is then selected and the adaptive controller is allowed to null on the calibration signal for the remainder of the dead time. Timing is provided via the frequency control word connector output.

When the transmitter signal is present, the calibration signal is shut off and the high-power controller adapts on the collocated transmitter signal with initial weight values achieved with the calibration signal. The high-power weight is kept in the control loop to continuously adapt until the start of the next transmit-hop interval.

Receive Antenna Interface

The receive antenna interface shown in FIG. 4 transfers signals from the receive antenna to the radio through a −6 dB directional coupler $C_4$ 44, a −20 dB directional coupler $C_5$ 46, and a transient suppressor switch 62. Signals arriving at the receive antenna are fed into coupler $C_4$ 44, which serves as the cancellation node for the adaptive controller in the system. The output of $C_4$ 44 is fed into $C_5$ 46, which generates a feedback signal to the correlator 48. The feedback (FBK) branch also has a coupler, $C_6$ 52, which drives the log video detector 54.

The forward output of $C_5$ 46 feeds a high power GaAs FET transient suppressor switch, which allows the digital processor to blank the output to the receiver during transients in the transmitter cancellation mode, and in the event that the transmitter and receiver hop to the same frequency simultaneously. The output of the transient suppressor 62 feeds the dedicated receiver 64. Initial blanking of the output to the receiver 64 reduces the possibility that the radio's AGC will be captured.

Correlator

Figure 12:
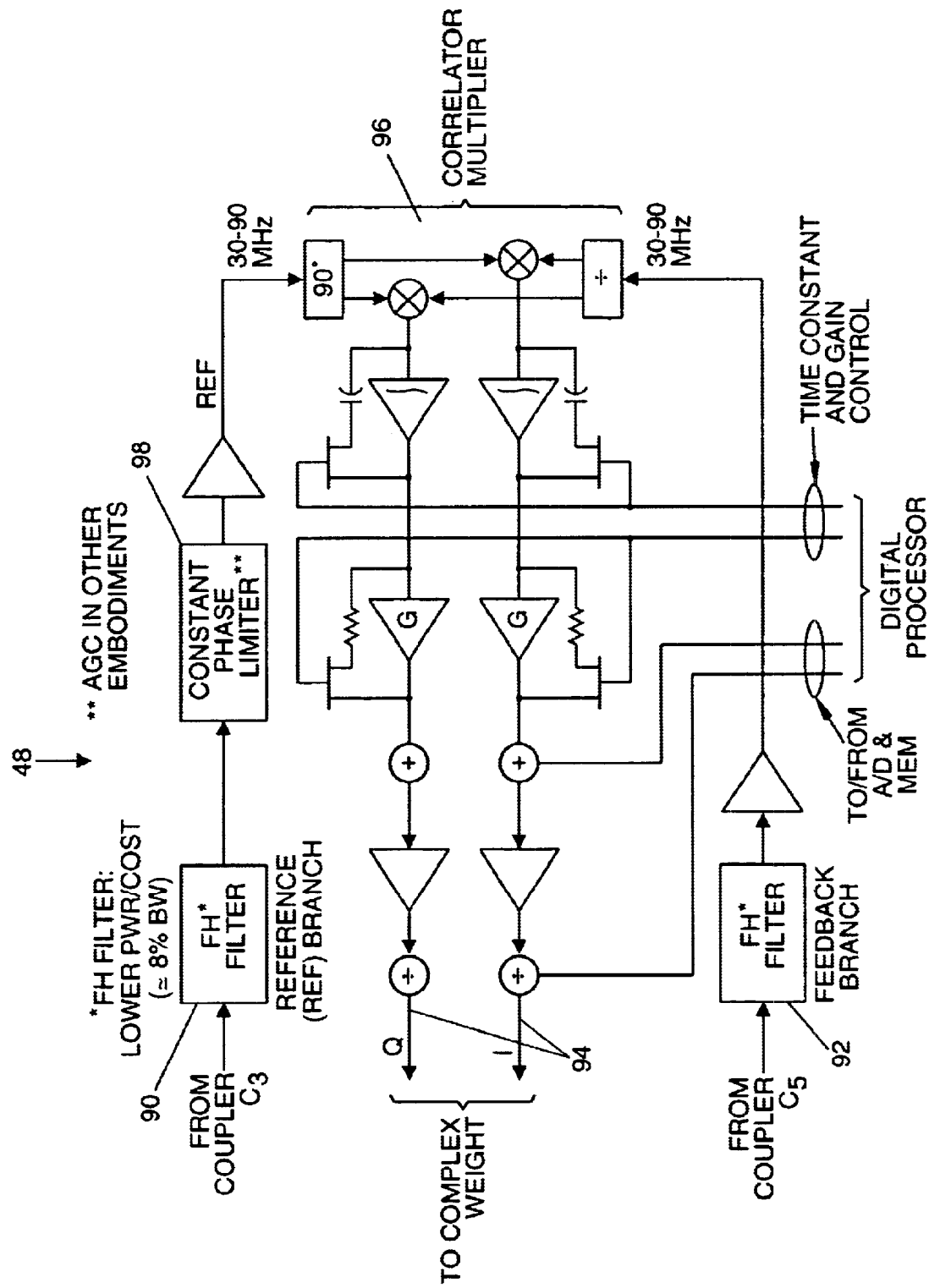
FIG. 12 illustrates the correlator used for control of the cancellation circuits including the constant phase limiter or AGC operating with low power FH filtering and two-gain-state baseband integrator.

FIG. 12 shows the VHF LMS-based correlator 48 used to control both states of the complex weight 42. Reference and feedback signals are filtered by secondary lower power hopping filters 90 and 92. LMS-based interference rejection techniques have often lost achievable performance improvement when tested on-the-air compared to laboratory evaluation. One major cause is dispersion effects. A possible secondary cause is the presence of external VHF signals not directly attributable to the co-sited transmitter. These signals can cause offsets in the I/Q correlator multiplier outputs 94, which affect nulling capability against the prime interferer. The secondary hopping filters 90 and 92 in this embodiment of the invention substantially reduce radiated signals entering the correlator multiplier 96 from the antennas.

A constant phase limiter or AGC 98 is used to maintain drive levels within the reference branch of correlator 48. Significant closed-loop gain, and resulting performance can be lost if these drive levels fall below nominally specified values. Reference levels can also vary, for example, with changes in the state of the amplitude tilt network, or other subsystems used within the equalizer function.

Baseband integration completes the correlator implementation. Two gains and time constants are used in the representative embodiment of the invention. One supports a 10 to 20 μs null-time in the low-power CAL mode. The other is slower by approximately a factor of ten. The slower mode is used to cancel the high-power, co-site transmitter.

Log Video Detector

The log video detector 54 as shown in FIG. 4 monitors the feedback signal of the adaptive controller. This determines the equalizer state corresponding to maximum cancellation of the calibration signal. The feedback signal is sampled by coupler $C_6$ 52 and is detected by a log amplifier circuit. Representative devices have a 70-dB dynamic range and a 0.1 v/dB sensitivity. To minimize possibility of extraneous signals capturing the log amp, the input to the log amp is also passed through an internal low-power frequency-hopping filter prior to entering the log video detector 54.

The baseband output of the log video detector 54 is fed into a 12-bit A/D converter within the digital processor 58. The digital representation of the nulled-feedback calibration signal is monitored for each state of the equalizer 38 during the transmitter dead time until the optimum state has been reached. When cancellation of the actual transmitter signal has begun, the log video detector 54 continues monitoring the feedback signal to measure system performance.

Calibration Signal Generator

The calibration signal generator 50 of FIG. 4 injects a low-level signal at the center frequency of the upcoming transmitter during its dead time. The signal is injected into the transmit antenna interface at a point $C_1$ 34 where the calibration signal will experience the same delay and amplitude effects as the actual transmitter signal. To emulate these delay and amplitude effects over a bandwidth consistent with that of the FH $T_x$ filter, the calibration signal is generated by modulating a direct digital synthesis (DDS) hopping signal generator with a 1-MHz tone, resulting in two spectral lines at ±1 MHz off the carrier frequency. Randomization of the frequency offset can be implemented in other embodiments.

This signal represents the broadband near-in phase noise, which will only be cancelled under matched delay and amplitude conditions. Once maximum cancellation of the calibration signal is achieved, optimum delay settings of the equalizer 38 are known and stored for use in cancellation of the transmitter signal.

The final output is filtered to reduce unwanted mixer products and pass the 2-MHz-wide calibration signal. Once the calibration process for a given frequency is complete, the calibration signal generator 50 is switched off. Effects on the receiver during calibration are minimal because the CAL signals received on the antenna are low-level tones, not wideband noise. These tones enter the receive-mode via the transient suppressor 62 in its low-loss mode.

Digital Processor

Figure 13:
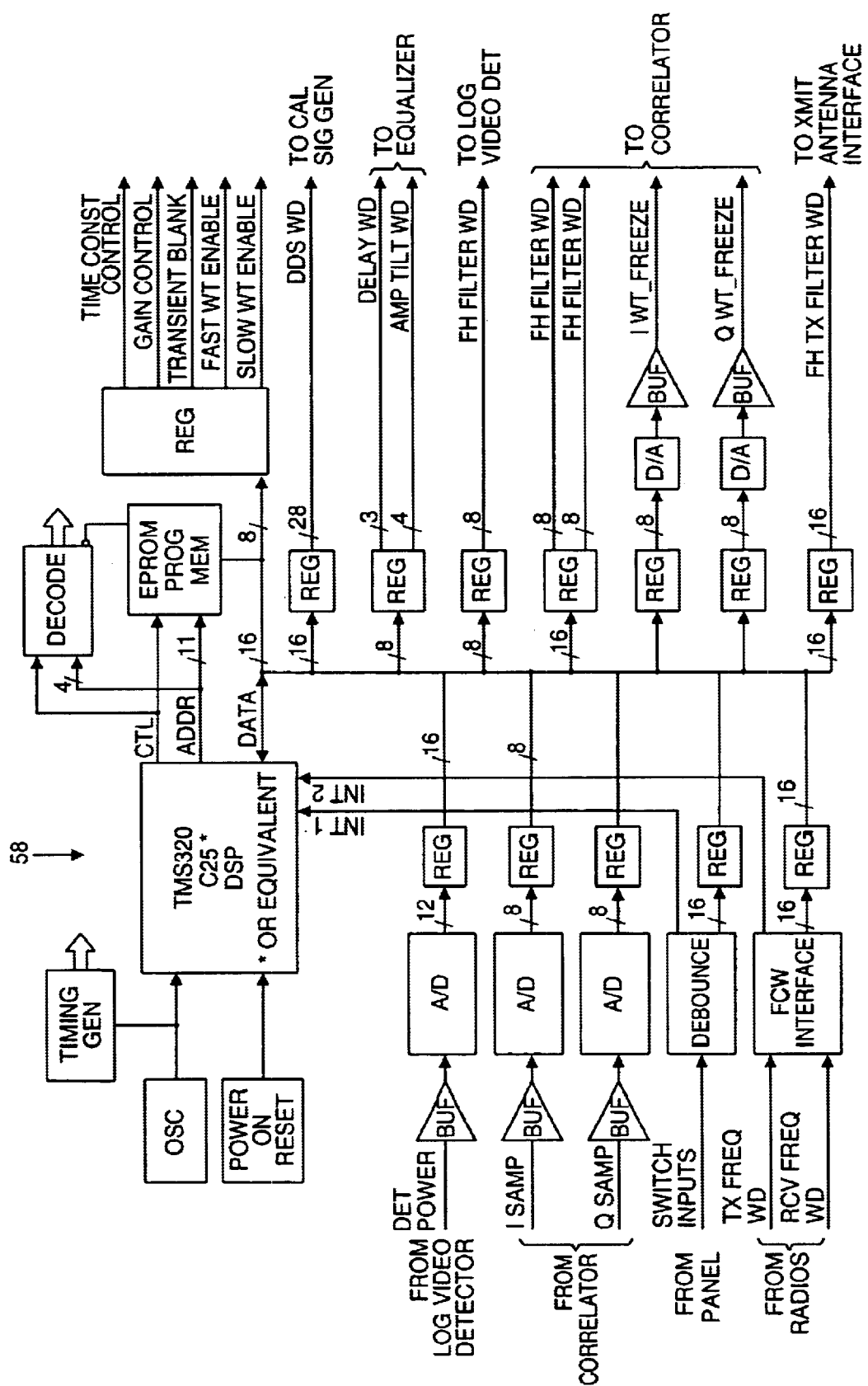
FIG. 13 shows the digital processor controlling system operation and modes.

The digital processor controls operations and modes using a high-speed digital signal processor (DSP). A representative embodiment is shown in FIG. 13. The normal calibration mode performs periodic equalizer calibration each time a transmitter frequency control word (FCW) is received. This trigger causes the DSP to 1) enable the fast complex weight, 2) select the fast baseband time-constant, 3) load the programmable filters in the correlator, log video detector, and transmit antenna interface with the new XMIT frequency word, 4) load the synthesizer in the CAL signal generator with the appropriate word, and 5) start sequentially loading the equalizer setting while monitoring the detected power from the log video detector.

When the DSP completes its calibration iterations, it stores the optimal equalizer settings for the particular XMIT frequency in RAM and reconfigures the system for the slow weight and slow time-constant states. The slow weight is then allowed to adapt on the calibration tones, which are disabled immediately after the transmit signal is present. The high processing rate of the DSP allows all of these operations to occur within the transmitter blanking interval.

Extension to Other Multiple Transmitter/Receiver Embodiments

The representative example describes an embodiment for a two-antenna relay with one co-site interferer. The basic concept is compatible with other co-site interference scenarios, including multiple-collocated transmitter/receivers. The invention is suitable for stationary platforms with no time-varying multipath. In more dynamic scenarios, it may be necessary to periodically interrupt the transmitted signal in order to update the equalizer circuit. Other embodiments may also be possible without transmitter interruption.

Both stationary and dynamic platform scenarios can be accommodated in a similar manner for the high-power mode by bypassing the FH transmit filter. If the selected FH transmit filter cannot operate at needed power levels, the filter can be bypassed to provide operation in essentially an ICS-only mode that still includes equalization with non-optimum (but incrementally improved) performance.

Figure 14:
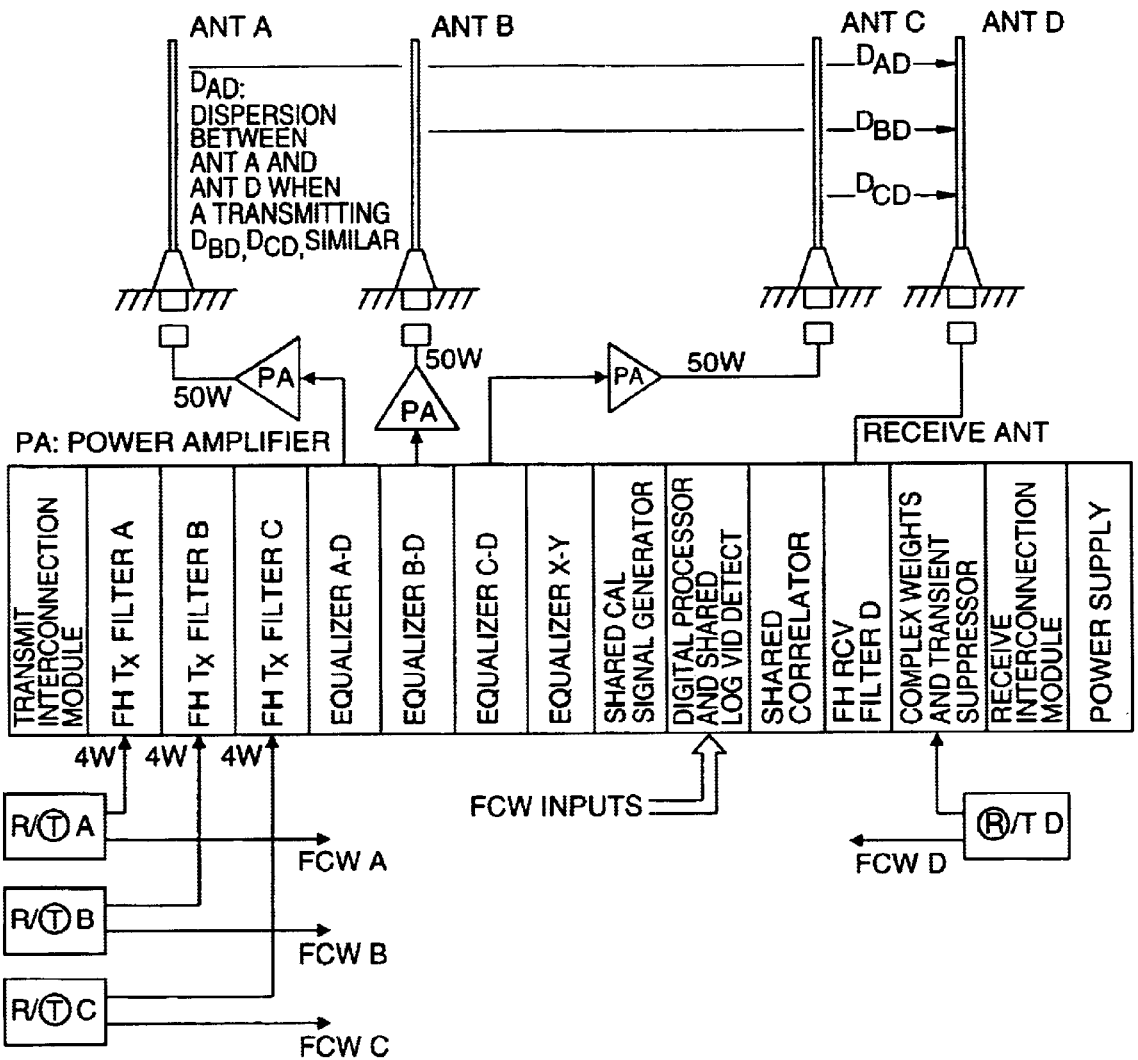
FIG. 14 shows extension of the embodiment to multiple transmitters and receivers.

The invention can readily be extended to multiple transmitters operating with full-hop-sets and separate antennas. The modular architecture of FIG. 14 is an appliqué for interfacing four R/T units (A, B, C, D) with four same-platform antennas in a difficult co-site environment. FIG. 14 shows a configuration with three simultaneous transmitters (A, B, C). One radio (D) is in a receive mode.

Independent equalizers (A–D, B–D, and C–D) are used because radiated dispersion characteristics to the protected receiver (D) from each transmitter ($D_{AD}$, $D_{BD}$, and $D_{CD}$) are generally different. The correlator, CAL signal generator, digital processor, and log video detector are shared to reduce cost.

A fourth equalizer is included in the architecture (X–Y) to be used when two transmitters are operating with two receivers. Each transmit antenna has a different radiated dispersion characteristic to each of the two receive antennas. A fourth high-power filter (FH RCV FILTER D) is used to protect the input to receiver D. The combined transmit and receive filtering minimize interference in this enhanced embodiment of the invention.

The transmit and receive interconnection modules in FIG. 14 functionally represent the process of reconfiguration from a three-transmitter configuration to one which uses two transmitters. The process can be performed manually or automatically with high-power relays operating with a system-level mode-sensing algorithm.

While there have been described what are at present considered to be the preferred embodiments of this invention, it will be obvious to those skilled in the art that various changes and modifications may be made therein without departing from the invention and therefore, it is aimed to cover all such changes and modifications as fall within the true spirit and scope of the invention.

What is claimed is:

1. An interference cancellation system for improved rejection of a signal coupled from a transmission antenna into a local receive antenna in the presence of local multipath comprising:

a frequency hopped radio adapted to operate in dispersion environment, said radio having an instantaneously limited bandwidth communication channel operating over a substantially larger bandwidth;

transmission means, associated with said radio, for transmitting the signal having a phase slope delay over the bandwidth via a directly coupled reference path and a received coupled path and wherein said transmission means has a dead time;

delay means for variably adjusting the phase slope delay of the signal in one path relative to the other path to provide matching between said paths, thereby enhancing the performance of said radio.

2. The interference cancellation system of claim 1 wherein said delay means filter comprises control means for adjusting the delay of the signal in real-time.

3. The interference cancellation system of claim 2 wherein said delay means is implemented in said directly coupled reference path.

4. The interference cancellation system of claim 2 wherein said delay means is implemented in said received path.

5. The interference cancellation system of claim 2 wherein said delay means further comprises a plurality of electrical path lengths of differing path lengths, with each of said electrical paths individually selectable by said control means.

6. The interference cancellation system of claim 2 wherein said delay means further comprises an N-tap tapped delay line having N selectable outputs, with each of said outputs individually selectable by said control means.

7. The interference cancellation system of claim 2 wherein said delay means further comprises a component having an electrically controllable delay connected to said control means wherein said radio can be adjusted to insert a delay in one of said paths such that said paths will match.

8. The interference cancellation system of claim 1 further comprising calibration means for injecting a calibration signal having an expected transmission frequency into said system.

9. The interference cancellation system of claim 8 wherein said calibration means further comprises two tones spaced equidistant from the expected transmit frequency.

10. The interference cancellation system of claim 8 wherein said calibration signal is injected into said system during the dead time of said transmission means.

11. The interference cancellation system of claim 8 wherein said calibration means further comprises a fast-response, low-power vector modulator weight signal.

12. The interference cancellation system of claim 8 wherein said calibration means further comprises a slow response high-dynamic-range variant adapted for nulling.

13. An interference cancellation system for improved rejection of a signal coupled from a transmission antenna into a local receive antenna in the presence of local multipath comprising:

a frequency hopped radio adapted to operate in dispersion environment, said radio having an instantaneously limited bandwidth communication channel operating over a substantially larger band;

transmission means, associated with said radio, for transmitting the signal having an amplitude slope over the band via a directly coupled reference path and a received coupled path;

amplitude slope means for variably adjusting the amplitude slope of the signal in one path relative to the other path to provide matching between said paths, thereby enhancing the performance of said radio.

14. The interference cancellation system of claim 13 wherein said amplitude slope means further comprises control means for adjusting the variable amplitude slope of the signal in real-time.

15. The interference cancellation system of claim 14 wherein said amplitude slope means is implemented in said directly coupled reference path.

16. The interference cancellation system of claim 14 wherein said amplitude slope means is implemented in said received path.

17. The interference cancellation system of claim 14 wherein said amplitude slope means further comprises a variable filter.

18. The interference cancellation system of claim 17 wherein said variable filter is a transversal filter having programmable weights, selectable by said control means, such that the phase and pass band of the band can be adjusted.

19. The interference cancellation system of claim 18 wherein said transversal filter has only two taps.

20. The interference cancellation system of claim 19 further comprising an amplitude tilt network with said transversal filter.

21. The interference cancellation system of claim 20 wherein said amplitude tilt network is balanced.

22. The interference cancellation system of claim 20 wherein said amplitude tilt network is unbalanced.

23. The interference cancellation system of claim 20 wherein said filter has a center frequency, a pass-band envelop, and a main lobe bandwidth that is much greater than the signal bandwidth and wherein the amplitude tilt adjusted is implemented by adjusting the center frequency of said filter causing the instantaneous band to be conditioned by a separate portion of the passband envelope, whereby the performance of said radio is enhanced.

24. The interference cancellation system of claim 13 further comprising calibration means for injecting a calibration signal having an expected transmission into said system.

25. The interference cancellation system of claim 24 wherein said calibration means further comprises two tones spaced equidistant from the expected transmit frequency.

26. The interference cancellation system of claim 24 wherein said calibration signal is injected into said system during a dead time of said transmission means.

27. The interference cancellation system of claim 24 wherein said calibration means further comprises a fast-response, low-power vector modulator weight signal.

28. The interference cancellation system of claim 24 wherein said calibration means further comprises a slow response high-dynamic-range variant adapted for nulling.

29. An interference cancellation system for improved rejection of a signal coupled from a transmission antenna into a local receive antenna in the presence of local multipath comprising:

a frequency hopped radio adapted to operate in dispersion environment, said radio having an instantaneously limited bandwidth communication channel operating over a substantially larger bandwidth;

transmission means, associated with said radio, for transmitting the signal having a phase slope delay and an amplitude slope over the bandwidth via a directly coupled reference path and a received coupled path;

delay means for variably adjusting the phase slope delay of the signal in one path relative to the other path;

amplitude slope means for variably adjusting the amplitude slope of the signal in one path relative to the other path;

digital controlling means, associated with said delay means and said amplitude slope means, for improving the matching of the signal in each path, thereby enhancing the performance of said radio.

30. The interference cancellation system of claim 29 further comprising calibration means for injecting a calibration signal having an expected transmission into said system.

31. The interference cancellation system of claim 30 wherein said calibration means further comprises two tones spaced equidistant from the expected transmit frequency.

32. The interference cancellation system of claim 30 wherein said calibration signal is injected into said system during a dead time of said transmission means.

33. The interference cancellation system of claim 30 wherein said calibration means further comprises a fast-response, low-power vector modulator weight signal.

34. The interference cancellation system of claim 30 wherein said calibration means further comprises a slow response high-dynamic-range variant adapted for nulling.

35. An interference cancellation system for improved rejection of a signal coupled from a transmission antenna into a local receive antenna in the presence of local multipath comprising:

a frequency hopped radio adapted to operate in dispersion environment, said radio having an instantaneously limited bandwidth communication channel operating over a substantially larger band;

transmission means, associated with said radio, for transmitting the signal having an amplitude slope over the band via a directly coupled reference path and a received coupled path;

amplitude slope means for variably adjusting the amplitude slope of the signal in one path relative to the other path to provide matching between said paths;

wherein said amplitude slope means further comprises control means for adjusting the variable amplitude slope of the signal in real-time and a transversal filter having only two taps and having programmable weights, selectable by said control means, such that the phase and pass band of the band can be adjusted; and wherein said filter has a center frequency, a pass band envelope, and a main lobe bandwidth that is substantially greater than the signal bandwidth, and wherein the amplitude slope adjusted is implemented by adjusting the center frequency of said filter causing the instantaneous band to be conditioned by a separate portion of the pass band envelope, whereby the performance of said radio is enhanced;

an amplitude tilt network associated with said transversal filter;

thereby enhancing the performance of said radio.

* * * * *